J. M. HARRISON.
SAP GATHERER.
APPLICATION FILED APR. 10, 1911.
1,016,406.
Patented Feb. 6, 1912.
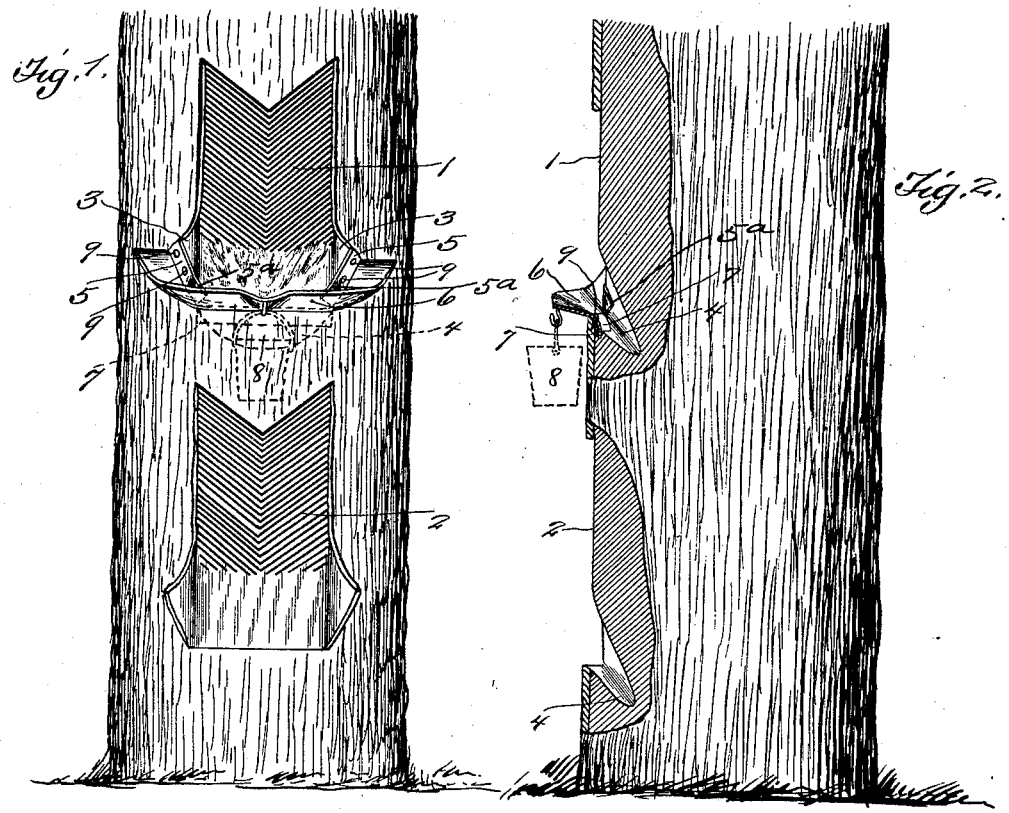
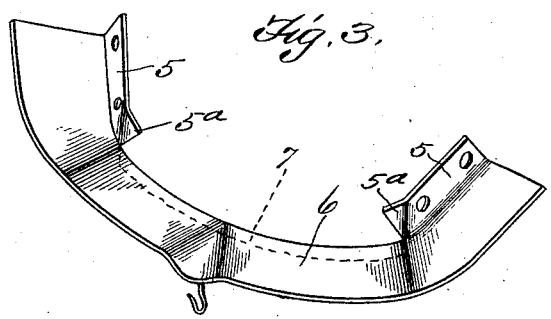
Witnesses
Inventor
Julius M. Harrison,
By D. Swift &C.
Attorney

UNITED STATES PATENT OFFICE.

JULIUS M. HARRISON, OF CORA, FLORIDA.

SAP-GATHERER.

1,016,406.  Specification of Letters Patent.  Patented Feb. 6, 1912.

Application filed April 10, 1911. Serial No. 620,120.

*To all whom it may concern:*

Be it known that I, JULIUS M. HARRISON, a citizen of the United States, residing at Cora, in the county of Santa Rosa and State of Florida, have invented a new and useful Sap-Gatherer; and I do hereby declare the following to be a full, clear, and exact description of the invention, such as will enable others skilled in the art to which it appertains to make and use the same.

This invention relates to a new and useful turpentine gathering spout or apron.

The main object of the invention is to provide a gatherer for turpentine, in the form of an apron, adapted to be attached to pine trees for the purpose of guiding the turpentine or resin that exudes from the chipped portion of the tree, into a receptacle maintained therebelow.

From experience it has been discovered that a great portion of the turpentine or gum has been lost by the employment of the gatherers that are now in practical use.

Another object of the invention is to provide a cheap, simple and effective gatherer constructed so that when applied, it will so embrace the tree as to obviate to a considerable extent this great loss.

In the drawings, however, there is only disclosed one form of the present invention, but in practical fields this form may require alterations, to which the applicant is entitled, provided the alterations are comprehended by the appended claims.

The invention comprises further features, combination of parts, as hereinafter set forth, shown in the drawings and claimed.

In the drawings:—Figure 1 is a view in elevation of a tree, showing the gatherer applied thereto and constructed in compliance with the invention. Fig. 2 is a detail sectional view of a portion of the tree, showing the manner of attaching the gatherer thereto. Fig. 3 is a detail perspective view of a gatherer showing the same detached from the tree.

Referring more especially to the drawings, 1 designates the part of the tree which has been chipped or cut, so that turpentine will exude therefrom during the gathering season, and the part 2 below the kerf 1 represents what has been chipped or cut away from the tree during a previous season. The end portions of the kerf extend into the bark of the tree, as indicated at 3, while the central portion of the kerf is cut into the core of the tree, as indicated at 4. The end kerfs 3 receive the end flanges 5 of the turpentine gatherer 6, in the manner shown in the drawings, thus providing means for properly supporting the turpentine gatherer. The flanges 5 are provided with ears 5ª to engage the corners or the ends of the kerf or pocket to hold the gatherer securely in place. The central kerf, however, receives the central flange 7 of the gatherer, in such wise as to permit the turpentine or other sap, which exudes from the tree, to freely flow into the gatherer, and thence into a suitable receptacle 8, maintained below the gatherer. The end and central flanges of the gatherer are secured in position by small tacks or sprigs or other means 9.

The gatherer is made of pliable sheet metal, such as tin or the like, which is formed into the shape of a spout, in order that the turpentine or the like will flow freely to the center thereof, thus obviating to the greatest extent the loss of turpentine, which heretofore frequently occurred. The central flange, however, essentially assists the curvature of the gatherer to prevent the loss of the turpentine.

This device not only may be used for gathering turpentine, but may also be utilized for gathering any and all kinds of sap.

From the foregoing it will be manifest, that there has been provided a novel, efficient, cheap, and practical sap gatherer, and one which has been found to fulfil the necessary requirements.

The invention having been set forth, what is claimed as new and useful is:—

1. A sap gatherer comprising a segmental sheet metal apron constructed with a substantially disposed horizontal portion provided with a spout inclined outwardly and upwardly of a tree having a pocket, the horizontal portion terminating at each end into upwardly extending portions having means adapted to be secured in end kerfs of the pocket, the horizontal portion having means adapted to be extended into and secured in the central portion of the pocket of the tree.

2. A sap gatherer comprising a segmental sheet metal apron constructed with a substantially disposed horizontal portion provided with a spout inclined outwardly and upwardly of a tree having a pocket, the horizontal portion terminating at each end into upwardly extending portions having flanges adapted to be secured in kerfs at each end of the pocket of a tree, the flanges having tri-angular shaped ears engaging the corners of the pocket, the horizontal portion having a central elongated flange adapted to be extended into the pocket and embedded in the tree, and means penetrating the first flanges and the central flange for securing the apron in place.

In testimony whereof I have signed my name to this specification in the presence of two subscribing witnesses.

JULIUS M. HARRISON.

Witnesses:
L. M. RHODA,
W. W. CLARK.